L. T. FREDERICK.
PROCESS OF MAKING RODS, TUBES, AND THE LIKE.
APPLICATION FILED APR. 5, 1917.

1,284,297. Patented Nov. 12, 1918.

WITNESSES:
Ed Plinke.
R. D. Brown

INVENTOR
Louis T. Frederick.
BY
Wesley G. Carr
ATTORNEY

UNITED STATES PATENT OFFICE.

LOUIS T. FREDERICK, OF WILKINSBURG, PENNSYLVANIA, ASSIGNOR TO WESTINGHOUSE ELECTRIC & MANUFACTURING COMPANY, A CORPORATION OF PENNSYLVANIA.

PROCESS OF MAKING RODS, TUBES, AND THE LIKE.

1,284,297.  Specification of Letters Patent.  Patented Nov. 12, 1918.

Application filed April 5, 1917. Serial No. 159,901.

*To all whom it may concern:*

Be it known that I, LOUIS T. FREDERICK, a citizen of the United States, and a resident of Wilkinsburg, in the county of Allegheny and State of Pennsylvania, have invented a new and useful Improvement in Processes of Making Rods, Tubes, and the like, of which the following is a specification.

My invention relates to the manufacture of composite rods, cylinders, tubes and similar objects from fibrous materials and binders, and it has for one of its objects to provide a method of imparting to such an object, in the course of its manufacture, a high degree of compactness and rigidity by applying a heavy longitudinal pressure to the material composing the object, while in a somewhat plastic condition and confined within a mold.

Figure 1:
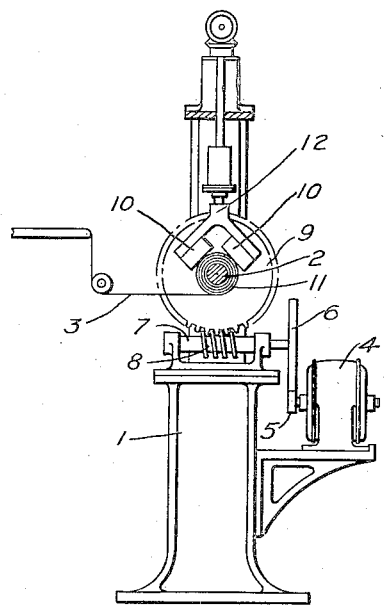
Figure 2:
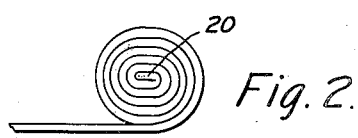
Figure 3:
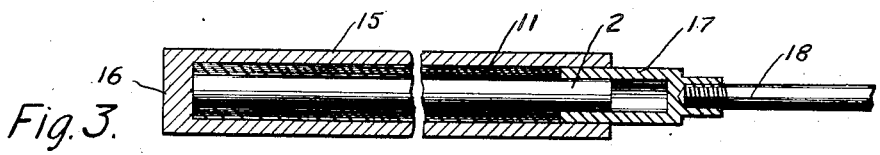
Figure 4:
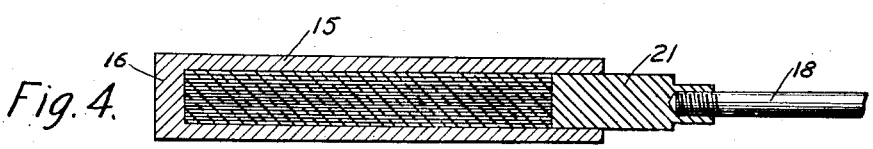

In the drawing, Figure 1 is a side view, partially in elevation and partially in section, showing the essential features of a machine for winding tubes preparatory to molding. Fig. 2 is an end elevational view of a roll of fabric adapted to be made into a rod according to my process. Fig. 3 is a longitudinal central sectional view of a mold and a plunger for completing tubes in accordance with my invention, and Fig. 4 is a longitudinal central sectional view of a mold similar to that shown in Fig. 3, but adapted to form rods and cylinders instead of tubes.

The tube-winding machine shown in Fig. 1 of the drawing is of well-known construction, and its structural details form no part of my present invention. It consists of a frame 1 in which is supported a rotatable mandrel 2 for receiving a sufficient number of superposed convolutions of strip material 3 to form a tube of the required thickness. The mandrel 2 is rotated, by means of an electric motor 4, through a train of gearing comprising a pinion 5, a gear wheel 6 and a worm shaft 7 carrying a worm 8 which meshes with a worm wheel 9 secured to the mandrel 2. Pressure members 10 are adapted to rest upon the tube 11 as it is wound upon the mandrel, the pressure members being preferably provided with suitable heating means and being attached to a vertically movable support 12.

The machine shown in Fig. 1 is adapted to wind tubes from absorbent sheet material, such as paper or cloth, impregnated with an adhesive substance which may variously consist of shellac or other varnish gum or of synthetic resins of which phenolic condensation products are well-known examples. The paper or cloth is coated or impregnated with the adhesive material and is wound upon the rotary mandrel 2, heat and pressure being applied by means of the members 10 during the winding operation in order to soften the adhesive material and to compact together the successive layers of fabric and adhesive material.

When the adhesive substance employed consists of a phenolic condensation product or other material which will harden under the influence of heat and pressure, it has heretofore been usual to complete a tube wound in the manner just described by subjecting the wound material, while still upon the mandrel, to air pressure and heat for the purpose of hardening the adhesive material. Tubes of this kind have also been completed by placing the mandrel carrying the tube in a heated mold composed of two semi-cylindrical halves corresponding in outline to the shape of the finished tube. This molding process produces tubes of greater strength and compactness than the air-pressure treatment. Heavy mechanical pressure is required, however, on account of the large surface area upon which pressure must be applied, and it is difficult to accurately gage the thickness of the tube walls.

According to my present invention, I complete tubes of the kind described above by means of longitudinal pressure, applied in a mold of which the essential features are shown in Fig. 3 of the drawing. This mold consists of a strong metal tube 15 of an internal diameter corresponding to the external diameter of the finished tube and of the cross-sectional shape to be imparted to the tube. The mold 15 is closed at one end, as shown at 16, and its other end is open to receive a mandrel 2 carrying the tube 11 to be finished. A circular plunger 17 of the same diameter and thickness as the finished tube is adapted to be inserted into the open end of the mold 15 and heavy pressure is applied to the plunger 17 through a rod 18 by suitable pressure-applying means which are not shown on the drawing. The mandrel 2 is circular in cross-section, if circular tubes are to be made, or it may be square, oblong or of other desired section in accordance with the nature of the tubes to be produced.

In forming a tube by means of the apparatus of Fig. 3, a sufficient number of convolutions of fabric treated with adhesive material is wound upon a mandrel by means of the machine of Fig. 1 or otherwise, to form a tube having an external diameter substantially equal to the internal diameter of the mold 15. The mandrel carrying the tube is then inserted in the mold 15, and the plunger 17 is thrust into the end of the mold and into contact with the end of the tube 11. Heavy pressure is then applied to the plunger, the mold and the plunger being heated if the adhesive employed is of a kind that hardens under the influence of heat. If the tube is preliminarily wound to such thickness that it can just be slipped into the mold 15, the reduction in the length of the tube during the pressing treatment will be very slight, and by reason of the fact that the tube is rigidly confined between the mold 15 and the mandrel 2, an exceedingly dense structure is imparted to the walls of the tube. If desired, the tube may be preliminarily wound without the application of heat and pressure, in which case the preliminary winding may be performed much more rapidly than when heat is employed in the winding process.

The apparatus of Fig. 3 may be utilized for making tubes from loose fibers and binders as well as from sheet material. In this case, a molding mixture is prepared by mixing raw cotton, hemp, or other loose fibers with a binder, which may be added to the fibers either in dry powdered form or in solution, and the mixture is then wrapped around a mandrel or packed between the mandrel 2 and the mold 15 of a molding device, such as that shown in Fig. 3. The tube is completed by applying heat to the mold and forcing the plunger 17 into the open end of the mold, as in the process described above. This method may be employed for making molded rings for gear blanks or for electrical insulation, the tubes made in the manner just described being cut transversely, after the molding operation is completed, into sections of the required dimensions.

Rods and cylinders may be made in accordance with my invention in much the same manner as tubes. When such solid objects are to be made, however, the first operation consists in forming a roll of adhesive-treated fabric, such a roll of material having substantially the form shown in Fig. 2 of the drawing. As shown in this figure, the edge of the fabric to be wound, which is shown much exaggerated in thickness for the sake of illustration, is first crimped as shown at 20 and the crimped or folded edge portion is employed as a foundation or mandrel upon which the remaining convolutions of material are wound. If desired, a small solid mandrel may be employed for preliminarily winding the material into a roll, such mandrel being withdrawn from the roll before the molding operation. The winding process may be still further modified by employing a mandrel composed of a material which may be left in the center of the finished rod.

The roll of fabric and binder, prepared in either of the methods described above, is placed in a mold 15, as shown in Fig. 4, and longitudinal pressure is applied to the material by means of a solid plunger 21 in order to compact the fibrous material and binder into a solid and substantially homogeneous mass, heat being applied, if necessary, as in the manufacture of tubes, in order to assist in hardening the adhesive material.

While I have mentioned certain specific materials and mechanical devices for the purpose of illustrating the principles of my invention, it is to be understood that my invention may be variously applied and modified in accordance with particular requirements. It is therefore to be understood that the materials and structural details described above are mentioned for the purposes of illustration only and not to impose limitations upon my invention, the scope of which is set forth in the appended claims.

I claim as my invention:

1. The process of making tubes that comprises winding upon a mandrel a plurality of convolutions of fibrous sheet material associated with a resinous condensation product, placing the mandrel carrying the wound material in a mold, and applying pressure axially of the wound material while confined in the said mold, the said mold being heated sufficiently to harden the said condensation product.

2. The process of making cylindrical bodies that comprises forming a roll of fibrous sheet material impregnated with a binder that is adapted to harden under the influence of heat and pressure, placing the said roll in a heated mold and applying pressure to the said roll in the direction of its axis while confined in the said mold.

In testimony whereof, I have hereunto subscribed my name this 29th day of March 1917.

LOUIS T. FREDERICK.